No. 882,079. PATENTED MAR. 17, 1908.
W. B. REED.
CAR FENDER.
APPLICATION FILED AUG. 5, 1907.

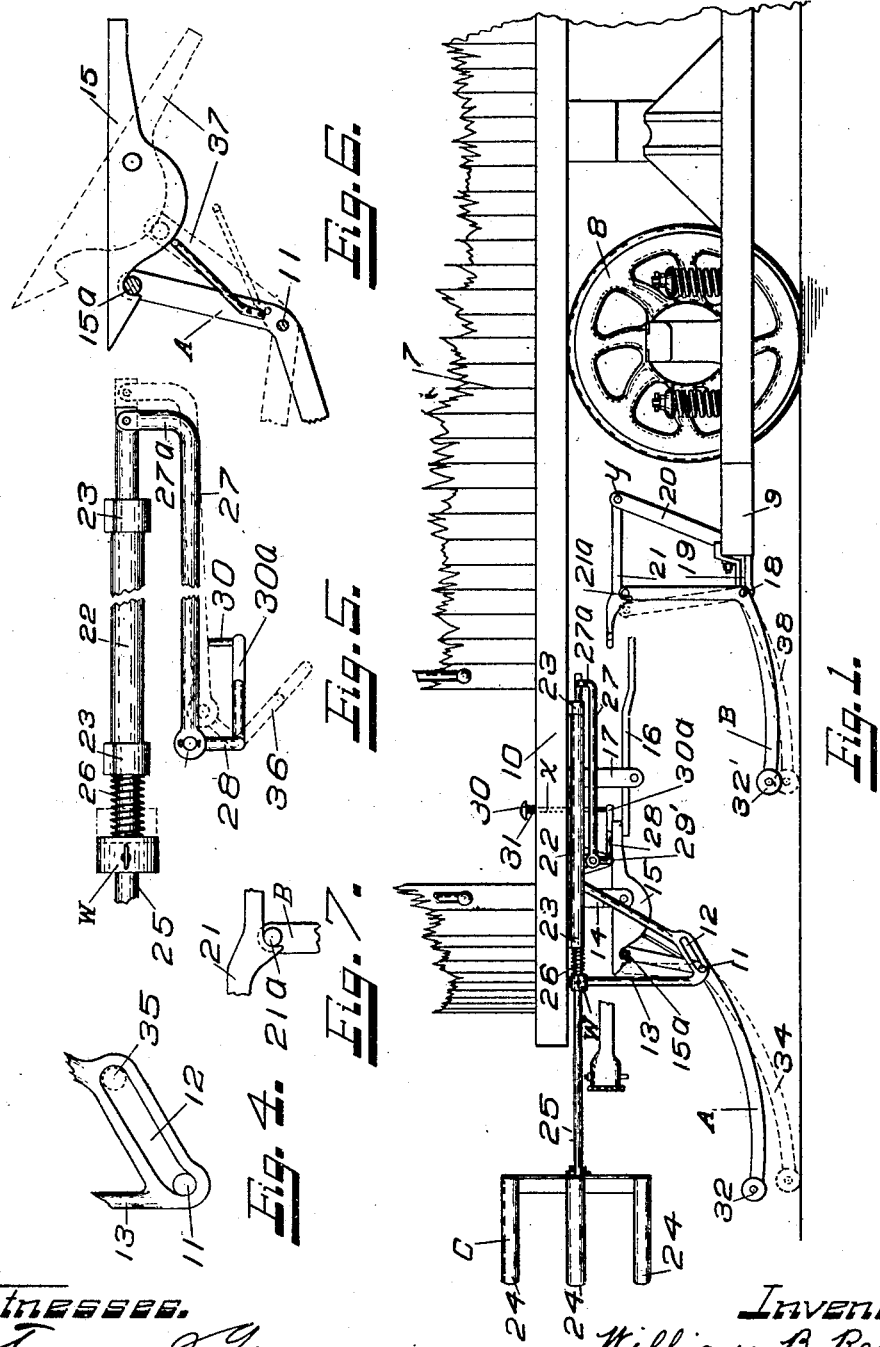

2 SHEETS—SHEET 2.

Witnesses.
Truman J. Glover
Lester L. Curl.

Inventor.
William B. Reed
by R. C. Wright
Attorney.

UNITED STATES PATENT OFFICE.

WILLIAM B. REED, OF PORTLAND, OREGON.

CAR-FENDER.

No. 882,079.      Specification of Letters Patent.      Patented March 17, 1908.

Application filed August 5, 1907. Serial No. 387,175.

*To all whom it may concern:*

Be it known that I, WILLIAM B. REED, a citizen of the United States, residing at Portland, in the county of Multnomah and State of Oregon, have invented a certain new and useful Improvement in Car-Fenders, of which the following is a specification, reference being had to the accompanying drawings.

My invention relates to improvements in car fenders.

The object of my invention is to provide a double fender or apron and buffer, the fenders to be so arranged that the aprons will drop automatically upon contact with an object or they may be caused to drop by the operator, and at the same time to arrange the said device so it will be safe, economical in construction and not obstruct or impede the operation of the car or its mechanism in any manner. These objects and other practical advantages, I attain by the construction, combination and arrangement of parts shown in the accompanying drawings which form a part of these specifications and in which,—

Figure 3:
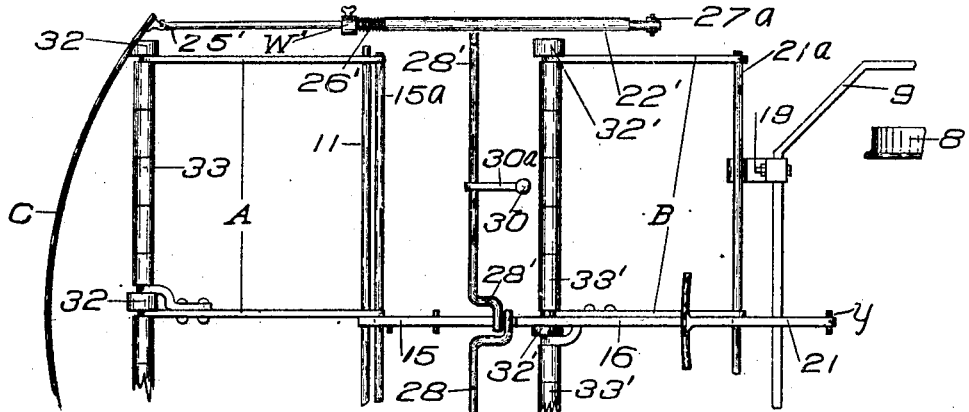
Figure 2:
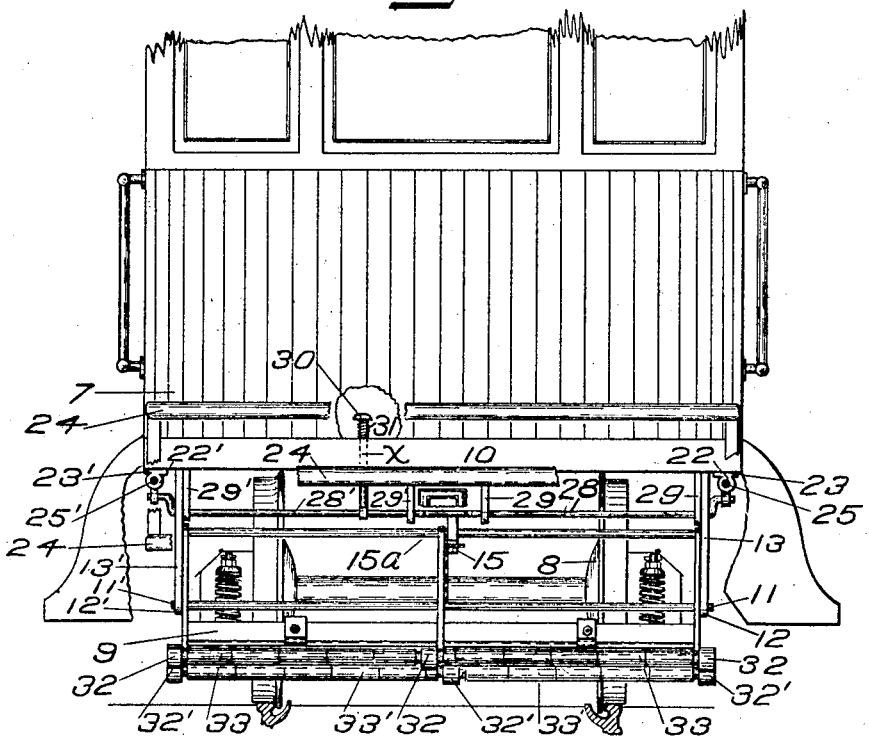

Figure 1 is a side elevation of part of a car showing my device attached thereto. Fig. 2 is a front view of the same. Fig. 3 is a plan view of my device with one side broken away and car body removed. Fig. 4 is a side view of a portion of hanger 13 showing slotted bearing. Fig. 5 is a side view of part of the buffer mechanism. Fig. 6 is a side view of a part of the front fender or apron mechanism. Fig. 7 is a side view of part of the dog mechanism of the rear apron.

Like numerals or letters refer to like parts throughout the views.

A is the front apron.

B is the rear apron.

C is the padded buffer.

The car body 7 is mounted on the usual type of trucks 8, which are provided with truck frames 9. A platform 10 extends a suitable distance beyond the trucks in a plane above them. The front apron A is of a suitable form and provided with a screen of light and strong material, adapting it to catch or scoop objects upon it. The rod 11, at the vertex of the angle of the apron A, carries it and is pivotally mounted on each end thereof in the slotted bearings 12—12' of hangers 13—13', which latter are rigidly secured to the bottom of the platform 10 in suitable positions. Just back of the center of the apron A, is a hanger 14, rigidly secured to the lower surface of the platform 10. Pivotally mounted in the hanger 14 is a dog 15, one end of which extends over the upper cross bar 15ª of the apron A, a sufficient distance to engage this cross bar and lock the apron in suspended position; while the other end of the dog 15 extends rearward a sufficient distance to engage a trip lever 16 pivotally mounted in a hanger 17 back of the dog 15. A rod 18, Fig. 1, at the vertex of the angle of the apron B, carries the same and is pivotally mounted at its ends in bearings 19, which are fixedly secured to the truck frame 9. This apron is provided with a screen like that of the apron A. Back of the apron B is an upright support 20 rigidly secured to the truck frame 9.

A dog 21 is pivotally mounted in the upper end of the support 20 on a pivot $y$. This dog 21 extends forward a sufficient distance to adapt it to engage an upper cross bar 21ª of the apron B, to lock the apron in suspended position, and also a sufficient distance to permit its engagement by and during the upward movement of the rear end of the trip lever 16. Pipes 22—22' are fixedly secured to the lower surface of the platform 10 in suitable positions on each side and near the front thereof, by means of hangers 23—23'. The buffer C, provided with three padded buffing rails 24, is fixedly secured in a suitable position in front of the car, upon the forward ends of the buffer rods 25—25' on each side, the said rods being loosely mounted within the pipes 22—22', and maintained in outward position by springs 26—26' Figs. 1, 3. Below the buffer rods 25—25', on each side, are parallel rods 27, longitudinal with the car, as seen in Figs. 1, 5. The parallel rods 27 are pivotally mounted at their rear ends to the rear ends of the buffer rods by vertical arms 27ª.

Bell crank levers 28—28', extending transversely from the side of the platform inwardly to points over the dog 15 are mounted in bearings 29—29' secured to the under side of the platform 10. The forward ends of the rods 27 are pivoted on the outer arms of the bell crank levers 28—28'. The bell crank levers 28—28' Fig. 3, are so angled at their inner ends as to adapt them to engage the dog 15. Rigidly secured to one of the bell crank levers, as 28' in a suitable position and longitudinally of the car, is a short arm 30ª. A vertical foot pin 30 passes through an opening $x$ in the platform, Fig. 1 just over the end of the arm 30ª. The pin 30 is upwardly maintained in this opening x by the spring 31 and it is adapted to engage the arm 30ª. The aprons A and B are provided with rollers 32—32' respectively at the sides and center. They are also provided with smaller rollers 33—33' respectively, between those just mentioned, all being on the lower lip of the aprons.

The buffer C can be easily set back or removed, by releasing the spring clamps w—w' Figs. 3, 5, and by releasing it from the arm 27ª of the parallel rods 29, when it may be slid back through or out of the pipes 22—22'.

It will now be seen that upon an object striking the buffer C, the buffer rods 25—25', or one of them, is forced backward to the position shown by the dotted lines 36, Fig. 5, and automatically operates both aprons by moving the bell crank levers 28—28', or one of them, if the impact is on the side. This movement causes the levers 28—28', or one of them, to depress the dog 15 and it in turn to depress the trip lever 16, which raises the dog 21, and thus allows both aprons to drop to the position shown by the dotted lines 34, 38 Fig. 1. The car operator may also drop both aprons in the same manner by pressing the foot pin 30 downward until it engages the arm 30ª, and thus moves the bell crank lever 28' with the same result as just described. It will also be noted, that should the cars move upon an object in such a manner that the object should come below the buffer and beneath the forward apron A, so as to raise the horizontal portion of the same upward, the apron A would move upon its pivot 11, the rod 15ª would be forced backward against the curved under surface of the dog 15 as shown by the position indicated by the dotted lines 37 Fig. 6. This movement of the dog will result in the dropping of the rear apron in the manner already shown. Again, should an object first strike the rollers of the apron A without contact with the buffer or going upon or under the apron A, this apron would be forced backward upon its pivot in the slots 12—12' to the dotted line position 35 Fig. 4, thus driving upwardly against the dog 15 causing it to move and drop the rear apron B as already described. The apron might also rise in the slots somewhat should a body pass beneath, but in any event the net result is to drop the rear apron. It will likewise be seen that the larger rollers 32—32' permit the aprons to move freely upon the ground or track space. The smaller rollers 33—33', being free of the ground, can thus rotate in the opposite direction and facilitate the rolling of a body upon the fender instead of catching the clothing and causing the body to be drawn below the apron, as would most likely be the result with rollers all of one size, rotating in the same direction as the car wheels.

I do contend that my device thus provides a car fender or guard having mechanism which reduces the shock to a human body when struck, also an apron or guard mechanism, simply constructed, easily kept in order, and quickly responsive to the impact of a human body upon the buffer, or the forward apron, or to the foot of the car operator, when it is intended the aprons shall be dropped to receive a body and prevent injury or death. The arrangement of double fenders, as also the padded buffer, reduces the chances of killing or maiming persons. The buffer is so arranged that it does not interfere with the coupling or other necessary equipment of the car. The forward fender readily accommodates itself to the direction in which a body will be approached, while the rear fender being mounted on the truck frame, will naturally follow the course of the track closely, and thus the two practically insure that no body can be upon the track, in the way of the car, without being caught by one or the other of the aprons. The double set of bell crank levers also supplies a means of operating the aprons without regard to the angle at which a body is struck by the car. The buffer or any part of my device can be quickly and easily removed or adjusted. I am aware that double fenders have been devised, but none mounted, arranged, constructed or operated as shown herein.

Having thus described my invention I claim:—

1. In a car fender or guard, buffer fender-dropping mechanism, consisting of a buffer C, provided with buffing rails and secured to the outer ends of buffer rods 25—25', which are slidably mounted in side pipes 22—22', rigidly secured upon the lower surface of the platform near the end and longitudinally of the car and are provided with outward retaining springs, parallel rods 27—27' arranged below the buffer rods, pivotally mounted at their rear ends to the rear ends of the buffer rods, by vertical arms, transverse bell crank levers 28—28', mounted in hanging bearings below the platform, pivoted on their outer arms to the forward ends of the parallel rods and angled at their inner ends in a form to engage a dog in a lower plane, an apron-holding dog 15 pivoted in a hanger back of the center of a forward fender, and extending forward sufficiently to engage a forward apron A pivotally hung to the platform, when in suspended position, a trip lever 16 pivotally mounted in a hanger back of said dog, extending forward far enough to be engaged by the dog 15 and far enough backward to engage a dog 21, a rear apron-holding dog 21, pivoted on an upright arm 20 rigidly secured to the car truck frame, and extending forward sufficiently to be engaged by said trip lever and to engage the rear apron B, pivoted upon the truck frame, when the apron is in suspended position, substantially as described.

2. In a car fender or guard, fender-dropping mechanism, consisting of a vertical foot-pin 30, slidably mounted in an opening in the car platform, upwardly retained by a spring, and extending below the platform sufficiently to engage a dog, transverse bell crank levers 28—28′, mounted in hanging bearings below the platform, and having a rigidly secured arm 30ª thereon, at a suitable angle and in position below the said pin, and inner ends angled in a form to engage a dog in a lower plane, an apron-holding dog 15 pivoted in a hanger back of the center of a forward fender, and extending forward sufficiently to engage a forward apron A pivotally hung to the platform, when in suspended position, a trip lever 16 pivotally mounted in a hanger back of said dog extending far enough backward to engage a dog 21, a rear apron holding dog 21, pivoted on an upright arm 20 rigidly secured to the car truck frame, and extending forward sufficiently to be engaged by said trip lever and to engage the rear apron B, pivoted upon the truck frame, when the apron is in suspended position, substantially as described.

3. In a double car fender or guard, a rear fender-dropping mechanism, consisting of a forward fender A, transversely pivoted in slotted bearings of side hangers rigidly secured to the lower surface of a car platform and having a transverse upper apron rod 15ª, an apron-holding dog 15 pivoted in a hanger back of the center of said fender, suitably curved on its lower side, and extending forward sufficiently to engage said apron when in suspended position, a trip lever 16 pivotally mounted in a hanger back of said dog in a lower plane, extending sufficiently forward to be engaged by the dog 15, and sufficiently backward to engage a dog 21, a rear apron holding dog 21, pivoted on an upright arm 20, rigidly secured to the car truck frame, and extending forward sufficiently to be engaged by said trip lever and to engage the rear apron B, when said apron is in suspended position, a rear apron B, pivoted upon the truck frame below said dog, substantially as described.

4. In a car guard or fender, buffer and double fender mechanism, consisting of a forward fender A transversely pivoted in slotted bearings of side hangers rigidly secured to the lower surface of a car platform and having a transverse upper apron rod 15ª, a rear apron B pivoted upon the car truck frame, a buffer c, provided with buffing rails and secured to the outer ends of rods 25—25′, buffer rods 25—25′, slidably mounted in side pipes 22—22′ rigidly secured upon the lower surface of the platform near the end and longitudinally of the car, the rods having outward retaining springs, parallel rods 27—27′ arranged below the buffer rods, pivotally mounted at their rear ends to the rear ends of the buffer rods by vertical arms, bell crank levers 28—28′ mounted in hanging bearings below the platform, pivoted on their outer arms to the forward ends of the parallel rods and angled at their inner ends in a form to engage a dog in a lower plane, an apron-holding dog 15 pivoted in a hanger back of the center of a forward fender, and extending forward sufficiently to engage the forward apron A when in suspended position, a trip lever 16 pivotally mounted in a hanger back of said dog, extending forward sufficiently to be engaged by the dog 15 and backward sufficiently to engage a dog 21, a rear apron-holding dog 21, pivoted on an upright arm 20, rigidly secured to the car truck frame, and extending forward sufficiently to be engaged by said trip lever and to engage the rear apron B when in suspended position, a rigidly secured arm 30ª on one of the bell crank levers arranged at a suitable angle and in position below a foot pin, a vertical foot pin 30 slidably mounted in an opening in the car platform above said lever arm 30ª and upwardly retained by a spring, all substantially as described.

5. In a car fender or guard, the combination with a car, of buffer fender-dropping mechanism, consisting of a buffer C provided with buffing rails and secured to the outer ends of buffer rods 25—25′, which are slidably mounted in side pipes 22—22′, rigidly secured upon the lower surface of the platform near the end and longitudinally of the car and are provided with outward retaining springs, parallel rods 27—27′ arranged below the buffer rods, pivotally mounted at their rear ends to the rear ends of the buffer rods, by vertical arms, transverse bell crank levers 28—28′, mounted in hanging bearings below the platform, pivoted on their outer arms to the forward ends of the parallel rods and angled at their inner ends in a form to engage a dog in a lower plane, an apron-holding dog 15 pivoted in a hanger back of the center of a forward fender, and extending forward sufficiently to engage a forward apron A pivotally hung to the platform, when in suspended position, a trip lever 16 pivotally mounted in a hanger back of said dog, extending forward far enough to be engaged by the dog 15 and far enough backward to engage a dog 21, a rear apron-holding dog 21, pivoted on an upright arm 20 rigidly secured to the car truck frame, and extending forward sufficiently to be engaged by said trip lever and to engage the rear apron B, pivoted upon the truck frame, when the apron is in suspended position, substantially as described.

6. In a car fender or guard, the combination with a car of fender-dropping mechanism consisting of a vertical foot pin 30, slidably mounted in an opening in the car platform, upwardly retained by a spring, and extending below the platform sufficiently to engage a dog, transverse bell crank levers 28—28', mounted in hanging bearings below the platform and having a rigidly secured arm 30$^a$ thereon at a suitable angle and in position below the said pin, and inner ends angled in a form to engage a dog in a lower plane, an apron-holding dog 15 pivoted in a hanger back of the center of a forward fender, and extending forward sufficiently to engage a forward apron A pivotally hung to the platform, when in suspended position, a trip lever 16 pivotally mounted in a hanger back of said dog, extending far enough backward to engage a dog 21, a rear apron-holding dog 21, pivoted on an upright arm 20 rigidly secured to the car truck frame, and extending forward sufficiently to be engaged by said trip lever and to engage the rear apron B, pivoted upon the truck frame, when the apron is in suspended position, substantially as described.

7. In a car fender or guard, the combination with a car of a rear fender-dropping mechanism, consisting of a forward fender A, transversely pivoted in slotted bearings of side hangers rigidly secured to the lower surface of a car platform and having a transverse upper apron rod 15$^a$, an apron-holding dog 15 pivoted in a hanger back of the center of said fender, suitably curved on its lower side, and extending forward sufficiently to engage said apron when in suspended position, a trip lever 16 pivotally mounted in a hanger back of said dog in a lower plane, extending sufficiently forward to be engaged by the dog 15, and sufficiently backward to engage a dog 21, a rear apron-holding dog 21, pivoted on an upright arm 20, rigidly secured to the car truck frame, and extending forward sufficiently to be engaged by said trip lever and to engage the rear apron B, when said apron is in suspended position, a rear apron B, pivoted upon the truck frame below said dog, substantially as described.

8. In a car fender or guard, the combination with a rear fender, of fender-dropping mechanism, consisting of a forward fender A, transversely pivoted in slotted bearings of side hangers rigidly secured to the lower surface of a car platform and having a transverse upper apron rod 15$^a$, an apron holding dog 15 pivoted in a hanger back of the center of said fender, suitably curved on its lower side, and extending forward sufficiently to engage said apron when in suspended position, a trip lever 16 pivotally mounted in a hanger back of said dog in a lower plane, extending sufficiently forward to be engaged by the dog 15, and sufficiently backward to engage a dog 21, a rear apron-holding dog 21, pivoted on upright arm 20, rigidly secured to the car truck frame, and extending forward sufficiently to be engaged by said trip lever and to engage the rear apron B, when said apron is in suspended position, a rear apron B, pivoted upon the truck frame below said dog, substantially as described.

9. In a car fender or guard, the combination with a car, of buffer and double fender mechanism consisting of a forward fender A transversely pivoted in slotted bearings of side hangers rigidly secured to the lower surface of a car platform and having a transverse upper apron rod 15$^a$, a rear apron B pivoted upon the car truck frame, a buffer C provided with buffing rails and secured to the outer ends of rods 25—25', buffer rods 25—25' slidably mounted in side pipes 22—22' rigidly secured upon the lower surface of the platform near the end and longitudinally of the car, the rods having outward retaining springs, parallel rods 27—27' arranged below the buffer rods and pivotally mounted at their rear ends to the rear ends of the buffer rods by vertical arms, bell crank levers 28—28' mounted in hanging bearings below the platform, pivoted on their outer arms to the forward ends of the parallel rods and angled at their inner ends in a form to engage a dog in a lower plane, an apron-holding dog 15 pivoted in a hanger back of the center of a forward fender, and extending forward sufficiently to engage the forward apron A when in suspended position, a trip lever 16 pivotally mounted in a hanger back of said dog, extending forward sufficiently to be engaged by the dog 15 and backward sufficiently to engage a dog 21, a rear apron-holding dog 21, pivoted on an upright arm 20, rigidly secured to the car truck frame, and extending forward sufficiently to be engaged by said trip lever and to engage the rear apron B when in suspended position, a rigidly secured arm 30$^a$ on one of the bell crank levers arranged at a suitable angle and in position below a foot pin and a vertical foot pin 30, slidably mounted in an opening in the car platform above said lever arm 30$^a$ and upwardly retained by a spring, all substantially as described.

WILLIAM B. REED.

Witnesses:
GEO. M. PARKER,
C. L. NICHOLS.